US006678070B1

(12) United States Patent
Seaman et al.

(10) Patent No.: US 6,678,070 B1
(45) Date of Patent: Jan. 13, 2004

(54) SYSTEM FOR PRODUCING PHOTO LAYOUTS TO MATCH EXISTING MATTES USING DISTANCE INFORMATION IN ONLY ONE AXIS

(75) Inventors: Mark D Seaman, Greeley, CO (US); K Douglas Gennetten, Ft Collins, CO (US); Paul M Hubel, Mt View, CA (US); David W Boyd, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/491,957

(22) Filed: Jan. 26, 2000

(51) Int. Cl.$^7$ .................. G06K 15/02; H04N 1/387; G06T 3/00; G06T 7/60; G06T 11/60
(52) U.S. Cl. ............... 358/1.18; 358/449; 358/453; 382/286; 382/291; 382/283; 707/518; 707/520
(58) Field of Search .............................. 358/1.18, 450, 358/449, 448, 453; 382/282, 283, 286, 291; 345/626, 634, 641, 629, 632; 707/505, 506, 517, 518, 520

(56) References Cited

U.S. PATENT DOCUMENTS

| 5,379,129 A | * | 1/1995 | Othmer et al. ............ 358/450 |
| 5,459,586 A | * | 10/1995 | Nagasato et al. .......... 358/450 |
| 5,459,826 A | * | 10/1995 | Archibald .................. 715/517 |
| 5,592,305 A | * | 1/1997 | Iwadate et al. ............ 358/448 |
| 5,594,850 A | * | 1/1997 | Noyama et al. ........... 345/632 |
| 6,222,637 B1 | * | 4/2001 | Ito et al. .................... 358/1.18 |
| 6,327,049 B1 | * | 12/2001 | Ohtsuka .................... 358/1.18 |
| 6,358,341 B1 | * | 3/2002 | Bergquist ................... 156/63 |
| 6,373,591 B1 | * | 4/2002 | Seaman et al. ............ 358/1.18 |
| 2003/0035875 A1 | * | 2/2003 | Dulebohn et al. ......... 426/548 |
| 2003/0160824 A1 | * | 8/2003 | Szumla ...................... 345/769 |

* cited by examiner

*Primary Examiner*—Scott Rogers
(74) *Attorney, Agent, or Firm*—Steven L. Webb

(57) ABSTRACT

The present invention is a system that coordinates the printing of a page of photos that match the layout of a pre-existing matte. The matte layout can be created from a physical matte. When creating an electronic layout or template from a physical matte, a digital image of the matte and a reference target is created. The template can then be created by using the relationship in the digital image between the image of the reference target and the image of the physical matte.

4 Claims, 6 Drawing Sheets

SYSTEM FOR PRODUCING PHOTO LAYOUTS TO MATCH EXISTING MATTES USING DISTANCE INFORMATION IN ONLY ONE AXIS

RELATED APPLICATIONS

The application "A System for Producing Photo Layouts to Match Existing Mattes" that has the H.P. docket number 10992524 is related to this application. The above referenced application was filed on the same day as this application.

FIELD OF THE INVENTION

The present invention relates generally to photo layouts and more specifically to a system that coordinates the printing of a page of photos that match the layout of a pre-existing matte.

BACKGROUND OF THE INVENTION

A user that wishes to group a set of images on a single page in an esthetically pleasing arrangement can do so in a number of ways. One way is to use one of the commercially available image editors. With an image editor the user can size, crop, and position a number of images onto one page and then print that page. Some image editors come with templates of esthetically pleasing openings. The user just selects an image for each of the openings in the template and then prints the page.

Another way someone can arrange a set of images is to use a pre-cut matte that has holes positioned to create a nice arrangement of photos. The user typically positions individual photos into the fixed locations within the pre-cut matte. It is sometimes difficult to get the correct alignment between the photos and the holes in the pre-cut matte. The user can fix the alignment problems by digitally arranging the images onto one page, using one of the commercially available image editors. The user would need to measure the positions and size of each of the openings in the pre-cut matte. Then the user could position and scale (size) an image to correspond to each of the openings in the pre-cut matte. Once the images were aligned onto one page the user could print that page and then lay the matte on top of the printed page. By having all the images aligned on one page, getting the correct alignment between the images and the matte is much easier. Unfortunately, measuring the size and position of each of the holes in a pre-cut matte is a tedious and time-consuming job.

The layouts of templates that come in an image editor do not necessarily match any pre-cut mattes that are available. When the user wants to enhance the appearance of the layout of their images by using a matte, they are stuck with aligning individual photos or measuring the size and position of each of the holes in a pre-cut matte. Therefore there is a need for a system that can create a template for a page layout from a pre-existing matte.

SUMMARY OF THE INVENTION

The present invention is a system that coordinates the printing of a page of photos that match the layout of a pre-existing matte. The matte layout can be created from a physical matte. When creating an electronic layout or template from a physical matte, a digital image of the matte and a reference target is created. The template can then be created by using the relationship in the digital image between the image of the reference target and the image of the physical matte.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENT

By quickly and easily creating a template from an existing matte, the current invention allows a user to create a one-page layout of images aligned to fit the existing matte. This allows the user to enhance the appearance of the layout of their image by using a matte, without the problem of aligning individual photos in each opening of the matte or without measuring the size and location of each opening in the matte.

Figure 1:
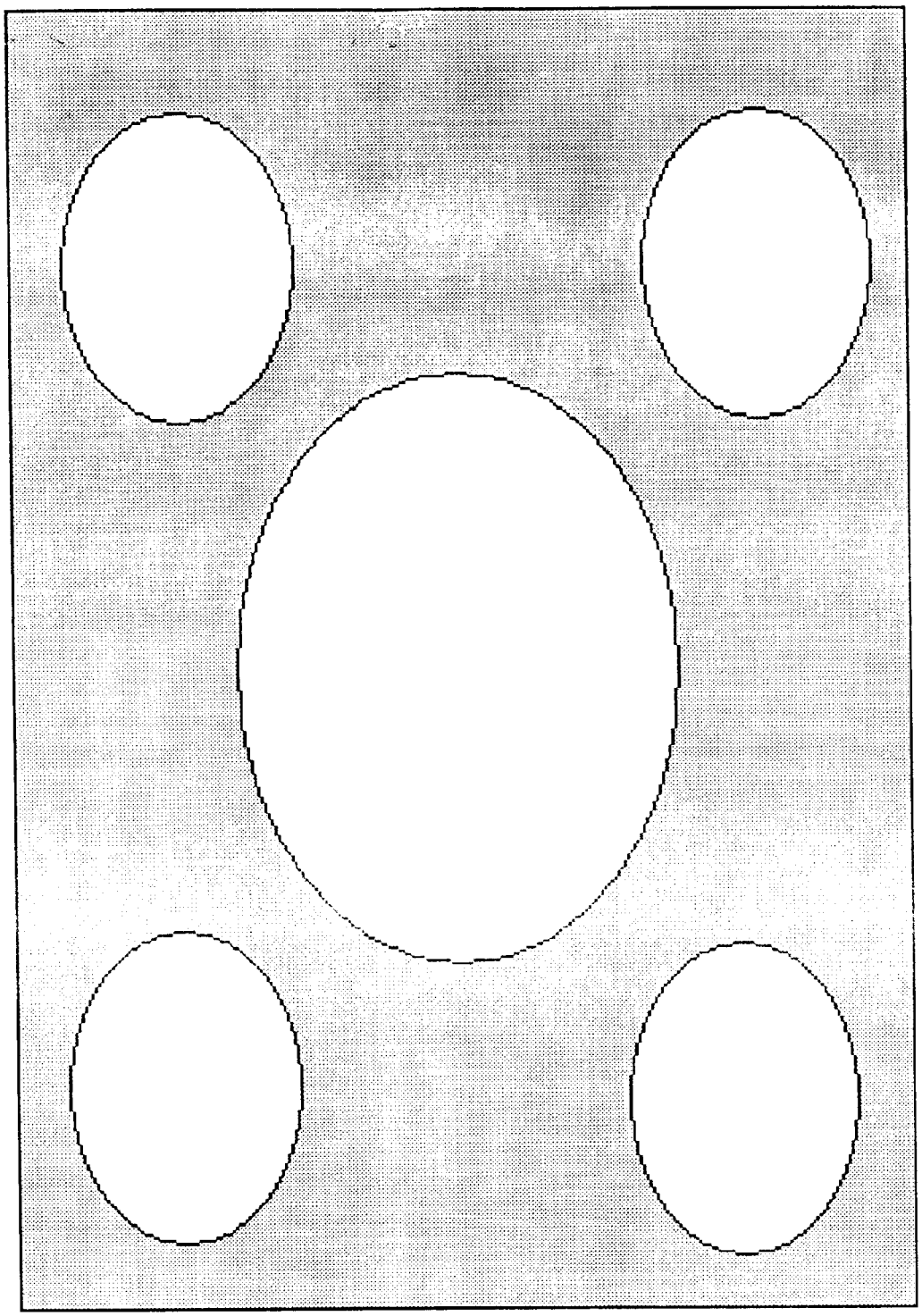
FIG. 1 is a front view of a matte.

FIG. 1 shows the layout of a typical matte that has an esthetically pleasing arrangement of openings. In some embodiments of the current invention, a reference target is used to create the information needed to calculate the size and location of each of the openings in the matte. In other embodiments the length of one side of the matte and the shape of the matte are used to create the information needed to calculate the size and location of each of the openings in the matte. Once the size and location of each opening in the matte has been determined a template can be created for that matte. Creating a template for the layout of images on a page, once the size and location of each opening for the layout has been determined, is well known in the arts.

In one embodiment of the current invention, a reference target is used to create the information needed to calculate the size and location of each of the openings in the matte. A digital image is created of the matte and the target. The digital image of the matte and target can be created with a scanner by placing both the matte and target on the scanner at the same time. Because it is easier to create the image of both the matte and the target using a digital camera, a digital camera is the preferred embodiment. When a digital camera is used to create the digital image, the plane defined by the image sensor may not be parallel to the plane defined by the matte. When the difference in parallelism between the two planes is large the difference can cause the image of the matte to be distorted (see FIG. 4). When the difference in parallelism between the matte and the image sensor is large these distortions need to be corrected to create an accurate template of the matte.

Figure 2:
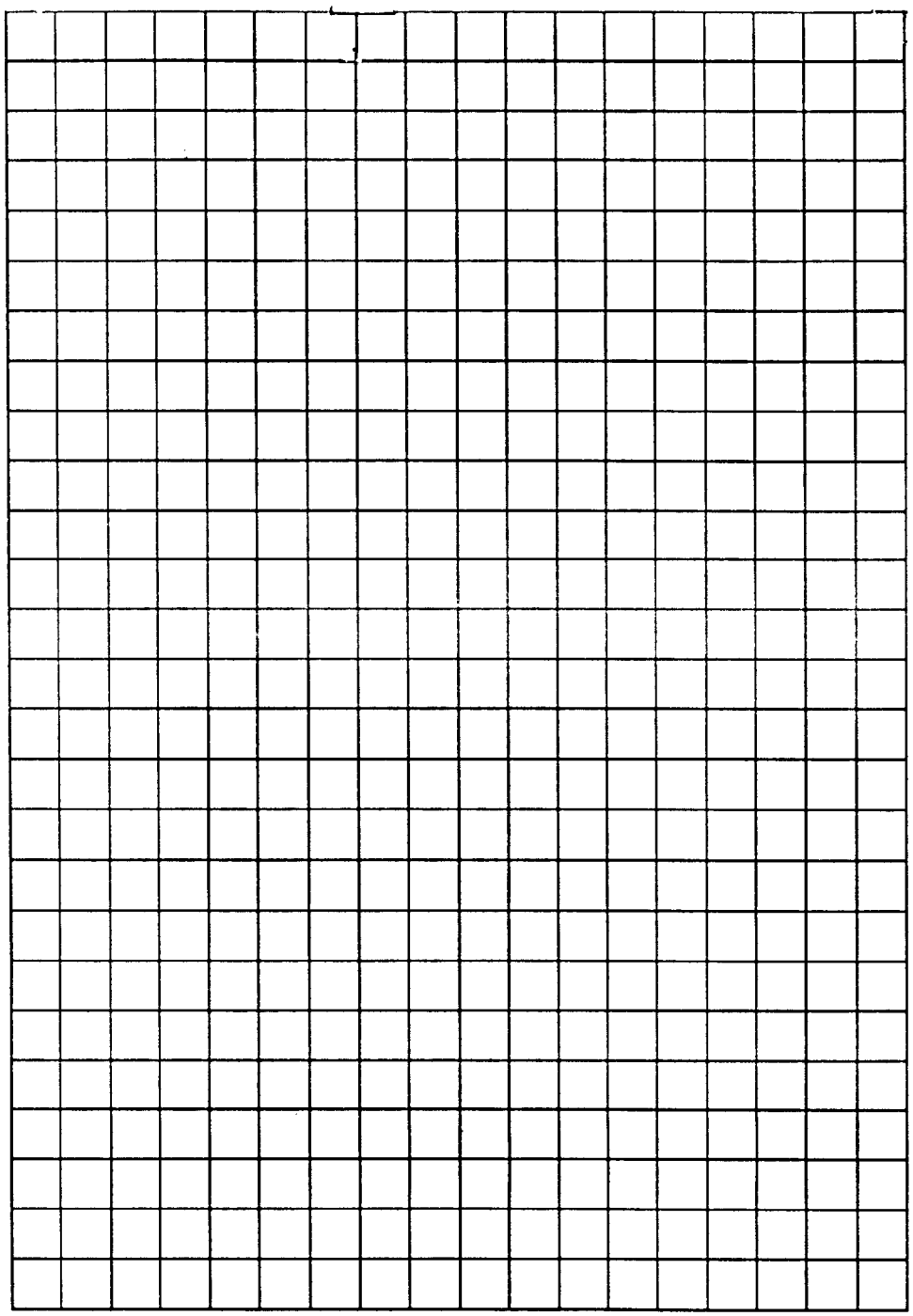
FIG. 2 is a front view of a reference target in accordance with the present invention.
Figure 3:
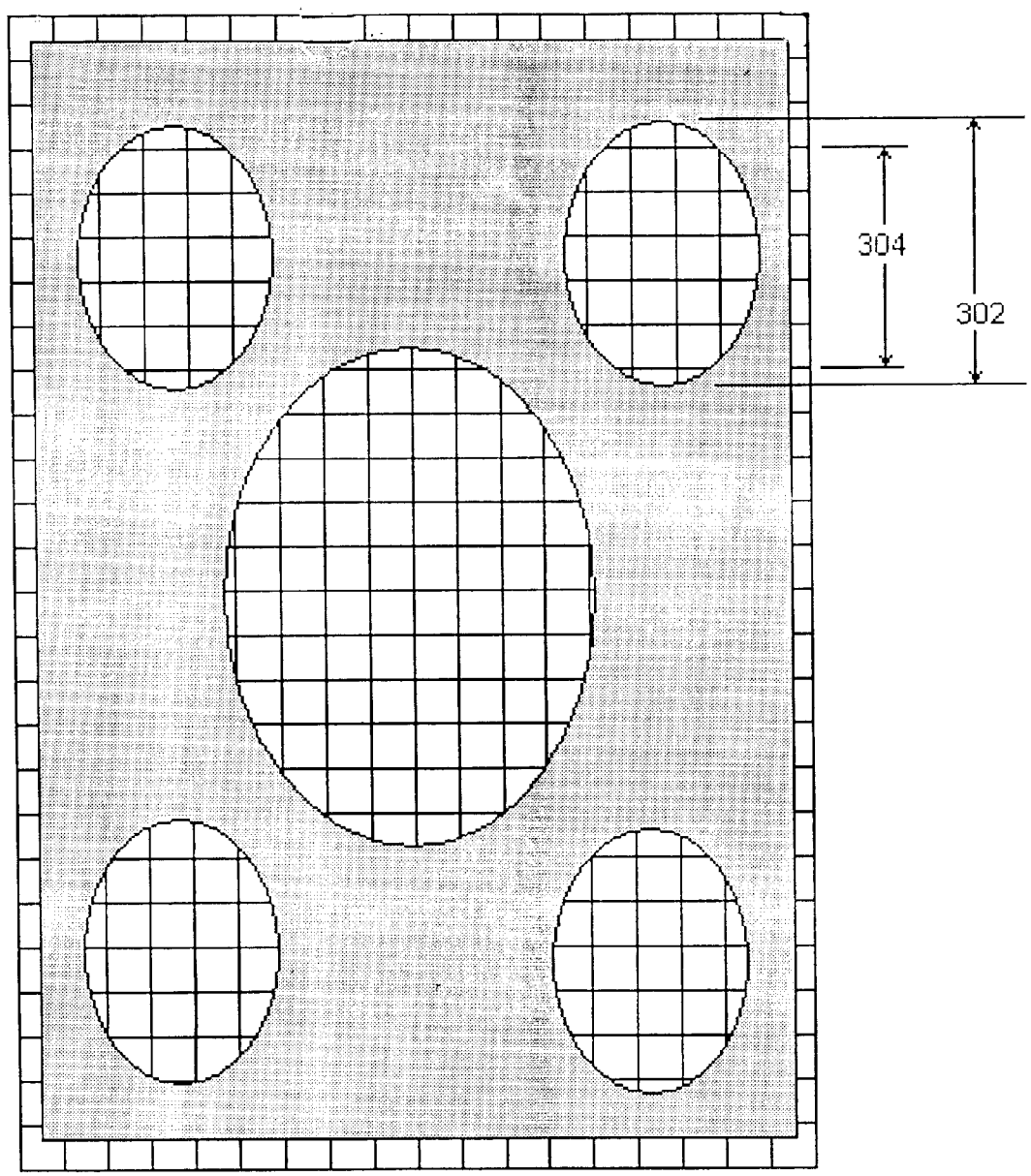
FIG. 3 is a front view of a matte and a reference target in accordance with the present invention.

FIG. 2 is a drawing of a target that can be used to create the information needed to locate the position and size of each of the openings in the pre-existing matte. The target has marks or a grid of a known spacing in two orthogonal directions. In one embodiment the target is opaque. To create a layout for a matte, the target is placed or held underneath the matte (see FIG. 3) such that the target is visible through each hole in the matte. In the preferred embodiment the target is larger than the matte and is visible around the edge of the matte. In another embodiment the target is transparent. To create a layout for a matte, the target is placed on top of the matte such that the grid is superimposed onto the matte. A digital image of the target and matte is created.

A digital image is composed of a two dimensional array of pixels, where each pixel is a representation of the amount of light sampled at that area. For color images the amount of light is measured in three different colors, typically red, green, and blue. The number of pixels in an image created with a digital camera is dependent on the size of the photo sensor array in the camera. Today a camera typically has a photo sensor that has 1620 samples, or pixels in width and 1220 samples or pixels in height. The number of pixels in an image created with a scanner depends on the resolution of the scan and the size of the area scanned. For example a matte that is 4 inches wide and 5 inches tall, scanned at 300 pixels per inch, would result in an image that was 1200 pixels wide and 1500 pixels high.

The location, in pixels, of the edges of each opening in the matte and the outer perimeter of the matte are determined. Edge detection algorithms are well known in the art. The pixel locations of the grid or marks on the target are determined. Knowing the physical size of the spacing on the target allow a conversion from pixels to inches to be calculated. The pixel to inch conversion is P/(NM * S). Where NM is the total number of marks or grid spacing, S is the known grid spacing, and P is the total number of pixels between the marks or grids. Once the pixel to inch conversion has been calculated, the location and size, in inches, of each opening in the matte can be determined. For example, the distance (302) between the top and bottom of one of the openings in the matte is 580 pixels. The distance (304) between the highest and lowest visible marks or gridlines in the same opening is 503 pixels. There are 5 divisions or grid spacing between the highest and lowest visible marks or gridlines in the opening. Each mark or grid is ½ inch in height. The pixel to inch conversion would be 503/(5 * 0.5)=201.2 pixels/inch. The height of the opening would be (580 pixels/201.2 (pixels/inch))=2.883 inches. Once each physical location on the matte is known the image template for the matte can be created.

When the digital image of the matte is distorted due to non-parallelism between the matte and the photo sensor, more than one pixel to inch conversion factor can be calculated. For example a conversion factor for two orthogonal axis (X and Y) in each opening can be calculated. By using more than one pixel to inch conversion, most of the distortion due to the non-parallelism will be corrected. Exact values of the sizes and locations of the openings in the matte are not required because the size of the images in the template created can be increased by some small amount to allow for a margin of error in the alignment of the matte and the image layout. When using a reference target that has information in two orthogonal directions the matte can be any shape (for example oval, rectangular, hexagonal, etc.).

In another embodiment of the current invention, the matte shape is restricted to rectangles. Because most mattes are rectangular, this is not a very limiting restriction. When the matte is rectangular in shape, the size and location of each opening in the matte can be determined by only using the length of one edge or side of the matte. The length information can be determined in a number of ways. A target with distance information in only one axis can be included in the digital image. One edge of the matte can be measured, or the height or width of the matte can be printed on the matte. Once the size and location of each opening in the matte has been determined a template can be created for that matte. Creating a template for the layout of images on a page, once the size and location of each opening for the layout has been determined, is well known in the arts.

Figure 4:
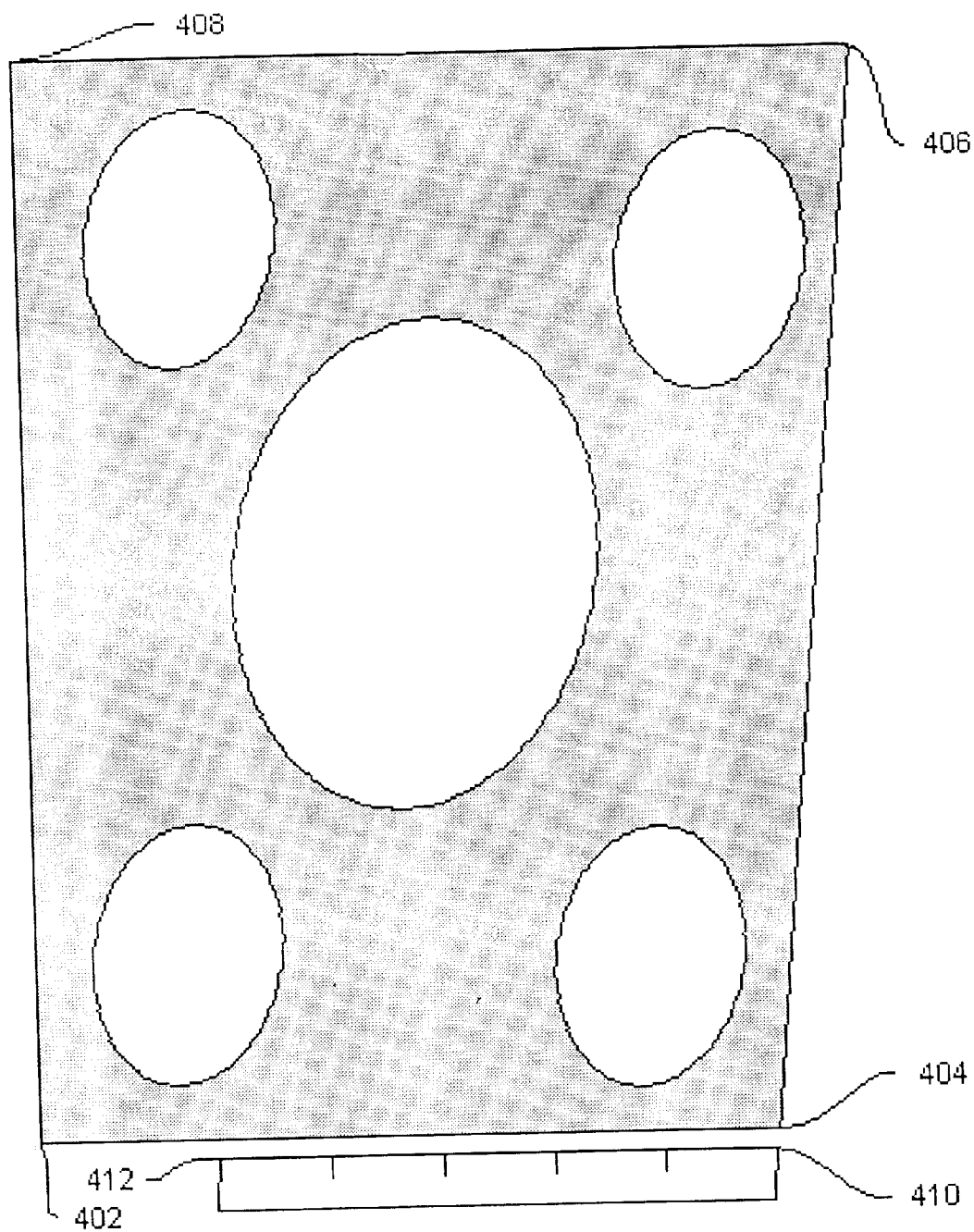
FIG. 4 is a distorted image of the front view of a matte and a reference target in accordance with the present invention.

In this embodiment a target with distance information in only one axis is included in the digital image (see FIG. 4). The target is placed or held next to one edge of the physical matte and a digital image of the matte and target is created. The digital image can be created using a digital camera, a scanner or any other device that creates digital images. Once the digital image has been created the length of one edge of the matte is calculated.

To calculate the length of one edge of the matte a pixel to inch conversion factor is determined. The pixel to inches conversion is P/(NM * S). Where NM is the total number of marks on the target, S is the known mark spacing of the target, and P is the total number of pixels between the marks. For example FIG. 4 is a digital image of a matte and a target with distance information in one axis. The distance between points 412 and 410 is 500 pixels, there are 5 marks between points 410 and 412, and the distance between each mark on the target is an inch. The pixel to inch conversion would be 500/(5 * 1)=100 pixels per inch. The distance between points 402 and 404 is 660 pixels so the length, in inches, between point 402 and 404 is 660/100=6.6 inches. The length of one side of the matte and the constraint that the matte is a rectangle is used to determine the x, y, z coordinates for each corner of the matte.

Figure 5:
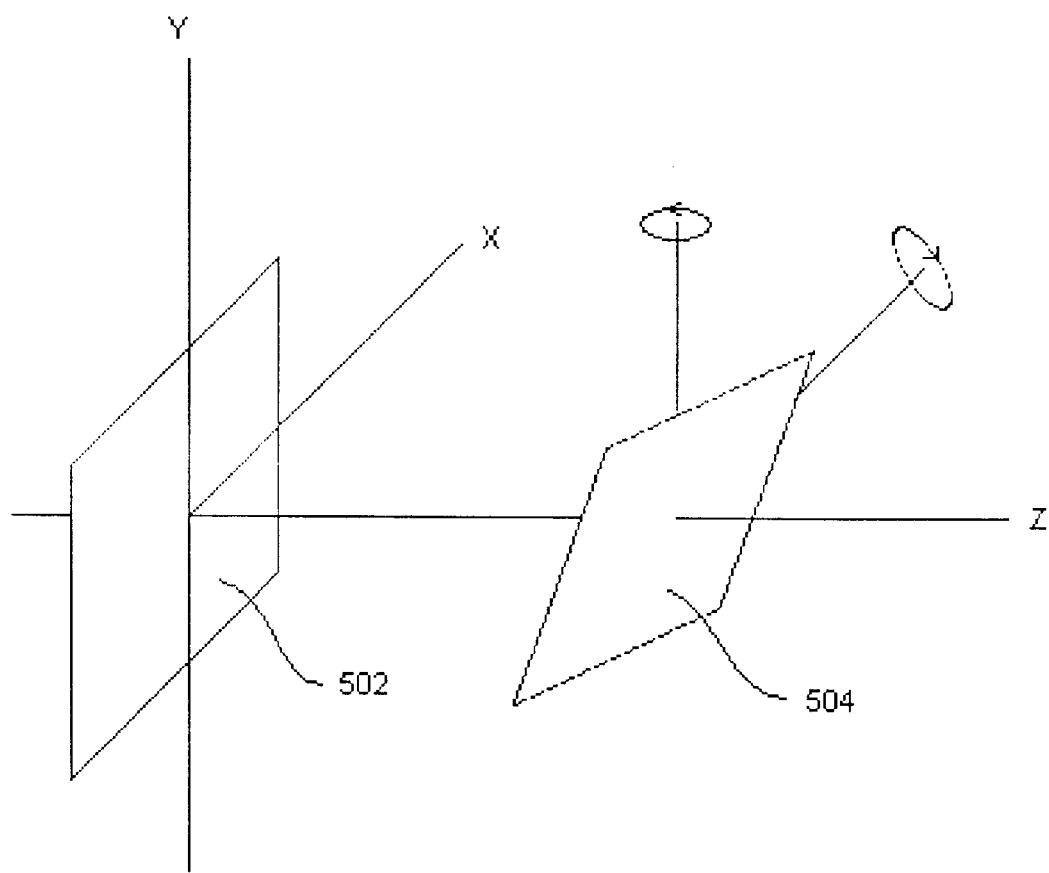
FIG. 5 is a perspective view of the relationship between two planes
Figure 6:
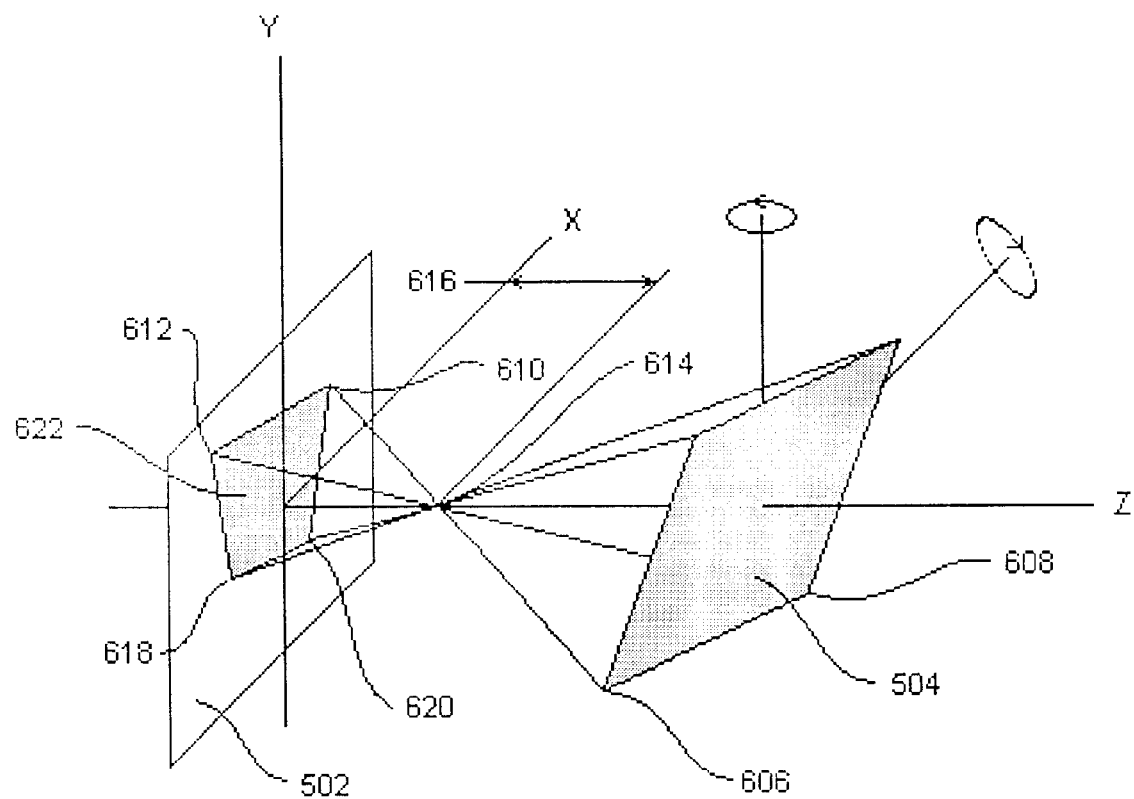
FIG. 6 is a perspective view of the projection of a rectangle onto a plane.

To calculate the x, y, z coordinates for each corner of the matte, the relationship between the plane defined by the matte and the plane defined by the photo sensor used to create the digital image, needs to be determined. FIG. 5 shows two planes 502, and 504. Plane 502 represents the plane defined by the photo sensor used to create the digital image of the physical matte and target. Plane 504 represents the plane defined by the physical matte. The x y coordinate system is defined to be in plane 502 with the z-axis perpendicular to plane 502. The relationship between plane 502 and plane 504 can be characterized by three variables: the distance, along the z axis, between plane 502 and 504, the angle of rotation, in the y axis, of plane 504, and the angle of rotation, in the x axis, of plane 504. FIG. 6 shows the projection of a rectangle on plane 504, through point 614, onto plane 502. The projection point 614 is distance 616 away from plane 502, along the z-axis. Each point on the rectangle has been projected through point 614, onto plane 502. For example point 606, projected through point 614, onto plane 502, results in point 610. FIG. 622 bounded by points 610, 612, 618 and 620 is the result of the projection of rectangle 504, through point 614, onto plane 502. Plane 502 represents the photo sensor in the digital camera or scanner, therefore FIG. 622 is the representation of the digital image of the physical matte created by the digital camera or scanner. To calculate the x, y, z, coordinates of the corners of rectangle 504, using the digital image of the physical matte (FIG. 622), four lines are projected from the four corners of FIG. 622, through point 614. A rectangle is defined such that each of the rectangle's corners lies on a corresponding line. Then the length of one edge of the rectangle is constrained to be the known physical length of the corresponding edge of the matte. There are 4 unknowns: the angle of rotation of plane 504 about the y axis, the angle of rotation of plane 504 about the x-axis, the distance between plane 504 and plane 502, and the distance (616) between the projection point 614 and plane 502. There are four constraints: the length of one edge of rectangle 504 is known, the top and bottom edge of rectangle 504 are parallel, the two sides of rectangle 504 are parallel, and the angle between the top edge and each side edge is 90 degrees. The values of the 4 unknowns can be solved by a numerical method using the 4 constraints. Numerical methods for solving for 4 unknowns with 4 constraints are well known in the arts. Once the x, y, z, coordinates of the 4 corners of rectangle 504 are known, a perspective transform matrix can be defined that will map the location of each point from FIG. 622 back onto rectangle 504.

Given a set of point correspondences where each point (x1, y1) has been projected onto a corresponding point (x1', y1') and there are at least 4 sets of points, a perspective transform matrix can be determined. The form of the perspective transform matrix is $$\begin{bmatrix} u \\ v \\ w \end{bmatrix} = \begin{bmatrix} a, b, c \\ d, e, f \\ g, h, 1 \end{bmatrix} \begin{bmatrix} x \\ y \\ 1 \end{bmatrix}$$

where x'=u/w and y'=v/w. The matrix has 8 unknowns a, b, c, d, e, f, g, and h. Multiplying out the transform matrix gives x'=(ax+by+c)/(gx+hy+1) and y'=(dx+ey+f)/(gx+hy+1). Thus each point correspondence x1, y1→x1', y1' provides two linear equations in the 8 unknowns. 4 sets of point correspondences (the four corners of rectangle 504 projected onto plane 502) yields 8 linear equations. With 8 linear equations in 8 unknowns, the value for each of the 8 unknowns (a, b, c, d, e, f, g and h) can be determined. Once the values for the transform matrix have been determined any point on FIG. 622 can be translated back to its corresponding location on rectangle 504. This allows the determination of the size and location of opening in the physical matte. Once the size and location of each opening in the matte has been determined a template can be created for that matte. Creating a template for the layout of images on a page, once the size and location of each opening for the layout has been determined, is well known in the arts.

When the length of one edge of the physical matte is known, the digital image of the matte does not need to include the target with distance information in one axis. The physical length of the edge is used to constrain the rectangle in space, instead of creating a pixel to inch conversion factor to determine a length of an edge of the matte. Using the physical length of one edge of the matte the x, y, z, coordinates for each corner of the physical matte are determined. Using the location (x, y, z, coordinates) of the four corners of the physical matte and there corresponding projection locations on the photo sensor, the perspective transform matrix is determined. Using the projection transform matrix, each location in the digital image can be mapped to its corresponding physical location on the matte. This allows the determination of the size and location of each opening in the physical matte. Once the size and location of each opening in the matte has been determined a template can be created for that matte. Creating a template for the layout of images on a page, once the size and location of each opening for the layout has been determined, is well known in the arts.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of creating an electronic matte template, based on a rectangular physical matte, the rectangular physical matte having at least one opening, comprising:

creating a digital image of the physical matte;

determining the length of one side of the physical matte calculating the size and locations of the openings in the physical matte, using the information from the digital image of the matte and the length of the one side of the physical matte;

creating the electronic matte template using the size and locations of the openings in the physical matte.

2. A method of creating an electronic matte template, based on a rectangular physical matte, the rectangular physical matte having at least one opening, comprising:

creating a digital image of the physical matte and a target, the target having distance information in one axis;

determining the length of one edge of the physical matte, using the distance information from the digital image of the target;

calculating the size and locations of the openings in the physical matte, using the information from the digital image of the matte and the length of one edge of the physical matte;

creating an electronic matte template using the size and locations of the openings in the physical matte.

3. A method of creating a layout of printed images, based on a rectangular physical matte, the rectangular physical matte having at least one opening, comprising:

creating a digital image of the physical matte and a reference target, the reference target having distance information in one axis;

determining the length of one edge of the physical matte, using the distance information from the digital image of the target;

calculating the size and locations of the openings in the physical matte, using the information from the digital image of the matte and the length of one edge of the physical matte;

creating an electronic matte template using the size and locations of the openings in the physical matte;

designating digital images for each opening in the electronic template;

printing the layout of images on one page.

4. A method of creating a layout of printed images, based on a rectangular physical matte, the rectangular physical matte having at least one opening, comprising:

creating a digital image of the physical matte;

determining the length of one side of the physical matte calculating the size and locations oft he openings in the physical matte, using the information from the digital image of the matte and the length of the one side of the physical matte;

creating the electronic matte template using the size and locations of the openings in the physical matte;

designating digital images for each opening in the electronic template;

printing the layout of images on one page.

* * * * *